UNITED STATES PATENT OFFICE.

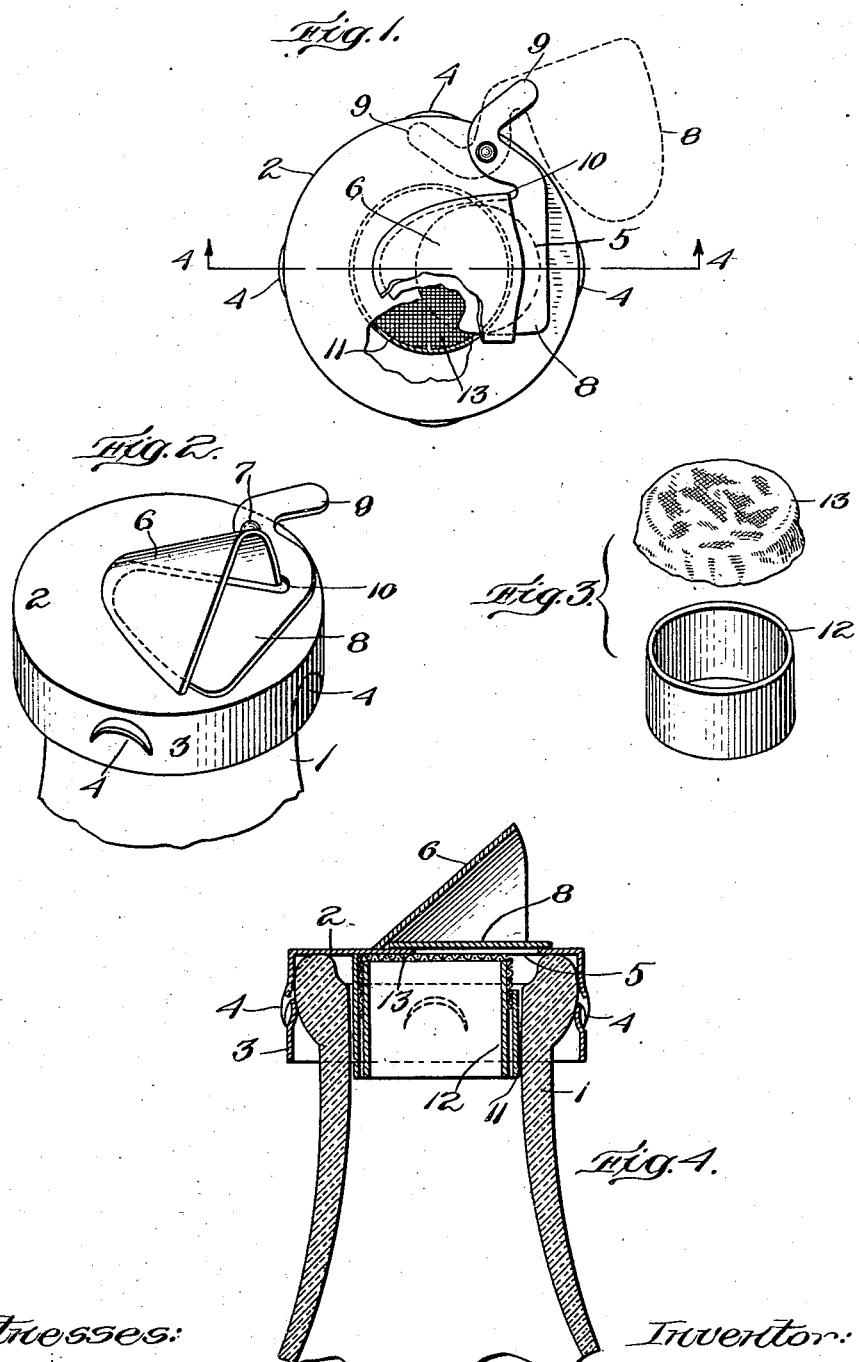

ABRAHAM FEINSTEIN, OF CINCINNATI, OHIO.

BOTTLE CAP AND POURER.

1,074,168.   Specification of Letters Patent.   Patented Sept. 30, 1913.

Application filed April 22, 1913. Serial No. 762,814.

*To all whom it may concern:*

Be it known that I, ABRAHAM FEINSTEIN, a citizen of the United States, and resident of Cincinnati, county of Hamilton, State of Ohio, have invented an Improvement in Bottle Caps and Pourers, of which the following description, in connection with the accompanying drawings, is a specification, like letters on the drawings representing like parts.

My invention is a removable cap or cover for a bottle, to protect its contents from dust, bacteria and the like, and is especially adapted to milk bottles, whereby the milk may be kept from external contamination and the bottle rendered otherwise more hygienic than is commonly the case. To this end I provide a cap, preferably removable and preferably containing a sterilized strainer which may be readily removed and cleaned and is made of convenient replaceable material, and a spout for directing the flow of the milk, together with a closing device for tightly closing the milk outlet.

In the accompanying drawings, in which I have shown a preferred embodiment of my invention, Figure 1 is a top plan view thereof; Fig. 2 is a perspective view of the top of a bottle provided with my cap; Fig. 3 shows the two removable parts of the strainer; and Fig. 4 is a central vertical sectional view on the line 4—4 Fig. 1.

For convenience of illustration I have shown my invention applied to the top 1 of an ordinary milk jar or bottle. A transverse cover plate 2 is provided with a depending peripheral flange 3 preferably having a plurality of inwardly bent spring holding clips 4 for retaining the cap on the bottle. The cover plate or top 2 is provided with a central outlet opening 5 about which is secured a spout 6 for directing the milk neatly and without drip into whatever receptacle it is being poured.

Secured by any suitable means as by a pivot 7 is a closing device 8 herein shown as provided with a handle 9 projecting beyond the cap and with a cut or slit 10 which permits said closing device to be moved within the spout 6 so as to close tightly over the outlet opening 5 when it is desired to set away the bottle in the refrigerator for instance.

Depending from the cover plate or cap 2 is a flange 11 adapted to enter within the neck of the bottle, this flange surrounding the outlet opening of the bottle cap to hold the strainer already mentioned. This strainer includes a cylindrical ring 12 fitting within the annular flange 11 and provided on its upper end with a piece of strainer cloth or gauze 13. This strainer 13 is simply laid over the upper end of the ring 12, which is then crowded up into place as shown in Fig. 4, thereby clamping the edges of the cloth tightly between the ring and the flange 11, where it is held stretched tightly in proper straining position just beneath the hole or outlet opening 5.

From the above description it will readily be seen that when the bottle is standing idle, the milk is kept entirely clean from the entrance of flies, dust and bacteria by the strainer screen 13 and by the swinging closure 8. When any milk is desired the closure 8 is simply swung back out of the way, and the milk then flows neatly from the spout 6 when the bottle is properly tipped. If there happens to be any foreign matter in the milk, such as a piece of straw, it is strained out of the milk by the strainer 13. When the bottle is empty, the entire cap is readily pulled off from the top of the bottle neck and is dropped into boiling water, the strainer having preferably first been removed so as to be thereby more readily sterilized. The handle 9 of the closing device 8 is so located that it is conveniently swung out of the way by the same hand of the user which holds and tips the bottle previous to pouring the milk from the spout 6. The two concentric annular flanges 3 and 11 form between them an annular space for receiving the bottle neck, which facilitates the placing of the cap on the bottle, said two flanges coöperating also to give strength to the device.

Various features of my invention may be changed in shape and arrangement and the combination of parts otherwise varied to a considerable extent without departing from the spirit and scope of my invention as hereinafter defined more explicitly in the claims.

Having described my invention, what I claim as new, and desire to secure by Letters Patent is:

1. A bottle cap and pourer, comprising a cover plate, two concentric flanges depending from said plate in position to receive the bottle mouth between them, said plate having a central outlet opening, a strainer held across said opening, a spout extending from said plate partially around said opening, and a flat closing device pivoted to the plate outside of said spout having a closing portion conforming in shape and size to the inner contour of the spout at its junction with said plate and provided with a recess which embraces one side of the spout when closed, thence terminating in a handle extending outward in position to be operated by the hand which is holding the bottle.

2. A bottle cap and pourer, comprising a cover plate, two concentric flanges depending from said plate in position to receive the bottle-mouth between them, said plate having a central outlet-opening, a piece of strainer material, a ring 12 clamping the edges of said piece against the inner of said two flanges with the body of the piece held stretched over the ring close to said opening, an external oblique spout extending from said plate about three sides of the opening, and a flat closing device pivoted to the plate outside of said spout, having a closing portion conforming in shape and size to the inner contour of the spout at the plate about the opening, and provided with a slit 10 which embraces one side of the spout when closed, and thence terminating in a handle extending laterally slightly beyond the edge of the cover plate in position to be operated by the hand which is holding the bottle.

In testimony whereof, I have signed my name to this specification, in the presence of two subscribing witnesses.

ABRAHAM FEINSTEIN.

Witnesses:
 ERNST R. GWINNER,
 BLANCHE SCHONEBERGER.